(12) United States Patent
Naka et al.

(10) Patent No.: US 6,859,682 B2
(45) Date of Patent: Feb. 22, 2005

(54) PET ROBOT CHARGING SYSTEM

(75) Inventors: Yoji Naka, Saitama-ken (JP); Hiroshi Endo, Saitama-ken (JP); Yoshihiro Ito, Saitama-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 63 days.

(21) Appl. No.: 10/397,531

(22) Filed: Mar. 27, 2003

(65) Prior Publication Data

US 2003/0187547 A1 Oct. 2, 2003

(30) Foreign Application Priority Data

Mar. 28, 2002 (JP) ........................... 2002-092788
Sep. 27, 2002 (JP) ........................... 2002-284237

(51) Int. Cl.[7] ................................. G06F 19/00
(52) U.S. Cl. .................. 700/245; 700/258; 700/259; 700/250; 700/253; 700/255; 318/568.11; 318/568.12; 318/568.21; 901/1; 901/15; 701/23; 345/156; 345/184
(58) Field of Search ............................... 700/245, 258, 700/259, 250, 253, 255; 318/568.11, 568.12, 568.21; 701/23; 345/156, 184; 901/1, 15

(56) References Cited

U.S. PATENT DOCUMENTS

| | | | | |
|---|---|---|---|---|
| 6,496,754 B2 | * | 12/2002 | Song et al. | 700/245 |
| 6,535,793 B2 | * | 3/2003 | Allard | 700/259 |
| 6,556,892 B2 | * | 4/2003 | Kuroki et al. | 700/245 |
| 6,587,751 B2 | * | 7/2003 | Takamura et al. | 700/245 |
| 6,604,021 B2 | * | 8/2003 | Imai et al. | 700/245 |
| 6,650,965 B2 | * | 11/2003 | Takagi et al. | 700/245 |
| 6,684,127 B2 | * | 1/2004 | Fujita et al. | 700/245 |
| 6,697,708 B2 | * | 2/2004 | Takagi et al. | 700/245 |
| 6,711,467 B2 | * | 3/2004 | Inoue et al. | 700/245 |
| 6,718,231 B2 | * | 4/2004 | Konno et al. | 700/245 |
| 6,718,232 B2 | * | 4/2004 | Fujita et al. | 700/245 |
| 6,728,599 B2 | * | 4/2004 | Wright et al. | 700/258 |
| 6,760,647 B2 | * | 7/2004 | Nourbakhsh et al. | 700/245 |

FOREIGN PATENT DOCUMENTS

| | | |
|---|---|---|
| JP | 11-126017 | 5/1999 |
| JP | 2001-121455 | 5/2001 |
| JP | 2001-125641 | 5/2001 |

OTHER PUBLICATIONS

Breaxeal et al., Recognition of affective communicative internt in robot–directed speech, 2002, Internet, pp. 83–104.*
Ho, A model of fuxxy emotion and behaviour selection for an autonomous mobile robot, 1997, IEEE, pp. 332–337.*
Ogata et al., Emotion communication robot: WAMOEBA–2R—emotion mdoel and evaluation experiments, 1999, Internet, pp. 1–16.*
Thrum et al., Pobabilistic algorithms and the interactive museum tour–guide robot minerva, 2000, Internet, pp. 1–35.*
Braunl, Improv and eyebot real–time vision on–board mobile robots, 1997, IEEE, pp. 313–135.*
Bischoff et al., Improving dependability of humanoids, 2001, IEEE, pp. 1–8.*
Maxwell, et al., Alfred: The robot waiter who remembers you, 1999, Internet, pp. 1–12.*

* cited by examiner

Primary Examiner—Thomas G. Black
Assistant Examiner—McDieunel Marc
(74) Attorney, Agent, or Firm—Sughrue Mion, PLLC

(57) ABSTRACT

Image data obtained by image-capturing by a pet robot is stored in a memory, and any of conditions whether the memory capacity is scarce, a captured image transfer instruction is made, or the battery capacity of the pet robot is scarce is satisfied, the pet robot is controlled to move to the charging apparatus. When the pet robot arrives at the charging apparatus, the image data is transferred to the charging apparatus. When the completion of transfer of the image data is detected, the image data already transferred is erased depending upon selection by the user.

15 Claims, 11 Drawing Sheets

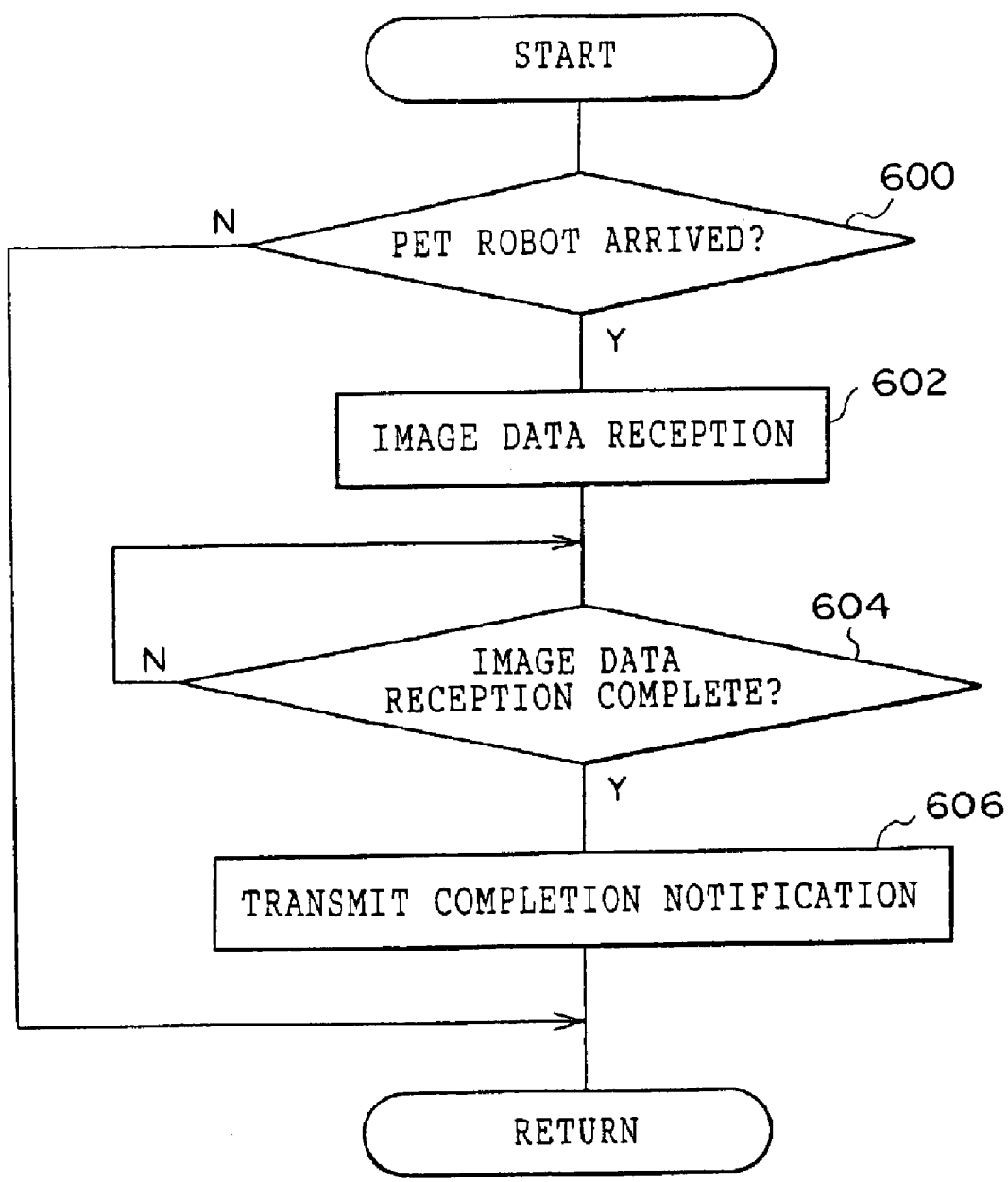

PET ROBOT CHARGING SYSTEM

BACKGROUND OF THE INVENTION

1. Field of the Invention

The present invention relates to a pet robot charging system, a receiving apparatus, a robot, and a robot system, and more particularly, to a pet robot charging system, a receiving apparatus, a robot, and a robot system capable of handling image data representing images and outputting the image data.

2. Description of the Related Art

Various kinds of pet robots have been suggested (see for example JP-A No. 11-126017: Patent Document 1). These pet robots have a number of operation sections. Buttons at these operation sections correspond to different concepts such as "scold" and "praise" and the user presses each button to make the pet robot act in response to the concept of the pressed button. For example, when the concept of the pressed button is "bark," the mouth of the pet robot is moved and a sound signal for the cry is output from a speaker. The pet robot of this kind can act like a living pet animal.

Pet robots having an image-capturing device for recognizing the user as its master or a ball etc. as a play tool have been suggested.

Such a pet robot includes an electrically-driven mechanism, and therefore charging its power source such as a battery is inevitable. Therefore, there are suggested techniques related to charging of pet robots (see for example JP-A No. 2001-121455: Patent Document 2).

According to the disclosure of Patent Document 2, whether or not to actually charge a mobile robot is determined by applying a charging rule to the recent charging log of the robot. A charging log includes recorded information on the number and frequency of charging, and the amount of supplied current. The charging rule defines whether or not to charge based on the content of the charging log. When the charging rule is appropriately produced, each action in the charging operation can be metaphorically phrased for example as "feeding" or "making it wait." Alternatively, the charging operation can be used as some penalty like "one pass" or "ejection" in a game played cooperatively among one or more such mobile robots. More specifically, Patent Document 2 suggests that conditions for charging the mobile robot are determined based on related information and the charging rule.

Another known pet robot includes visual identification data provided in a predetermined position of a charging station, an image-capturing section provided in the mobile robot, an operation section to calculate the distance and the direction from the mobile robot to the charging station based on captured images, and a searching section to allow the mobile robot to seek out the charging station based on the result of calculation by the operation section (see for example JP-A NO. 2001-125641: Patent Document 3). In this way, the mobile robot traces the visual identification data with its camera to seek out the charging station, and the charging operation can be automatically carried out. More specifically, according to the disclosed technique, the mobile robot autonomously seeks out and moves to the charging station to carry out charging.

These pet robots as described above may each include an image-capturing section such as an image sensor, so that the image-capturing section can capture an image. However, in order to hold the image data obtained by the image-capturing section, the pet robot needs a very large memory.

SUMMARY OF THE INVENTION

The present invention is directed to a solution to the above-described disadvantage, and it is an object of the present invention to provide a pet robot charging system that allows image data obtained by image-capturing by the pet robot to be held in an appropriate manner, a receiving apparatus, a robot, and a robot system therefor.

In order to achieve the above-described object, a pet robot charging system according to a first aspect of the invention includes a pet robot and a charging apparatus. The pet robot includes a pet robot and a charging apparatus, the pet robot comprising: an image-capturing section for capturing an image of an object; an image-capturing control section for controlling image-capturing by the image-capturing section in response to a predetermined image-capturing instruction; a storage section for storing image data obtained by image-capturing by the image-capturing section; a moving portion for autonomously traveling in a work space, a battery as a power source; a communication section for transmitting the image data, and for receiving charging position information representing a position to charge the battery, and a reception completion signal for transmission of the image data; a setting section for setting an erasure confirmation state in order to input confirmation for erasure of the image data corresponding to the reception completion signal from the storage section, when the reception completion signal has been received; and a control section for controlling the communication section to transmit the image data after the moving portion is controlled based on the charging position information, and for controlling the erasure of the image data from the storage section based on the reception completion signal and the confirmation input by the setting section, when a predetermined condition is satisfied, and the charging apparatus comprising: a transmitting/receiving section transmitting the charging position information, receiving the image data transmitted from the communication section, and transmitting the reception completion signal expressing the completion of reception of the image data; a charging section for charging the battery; and a storage section for storing the image data received by the transmitting/receiving section.

According to the first aspect of the invention, the pet robot has its image-capturing section controlled by the image-capturing control section. An image is captured in response to a predetermined image-capturing instruction, and image data obtained by image-capturing by the image-capturing section is stored in the storage section. In this way, the image captured from the visual point of the pet robot can be obtained. The predetermined image-capturing instruction may be given by activating a release switch function allocated for example to a foot of the pet robot. Alternatively, an image may be captured at predetermined time.

The pet robot can autonomously travel in a work space due to the moving portion, using the battery as a power source. At that time, the communication section receives charging position information representing the position at which the battery can be charged (such as positional information transmitted from the charging apparatus and representing the position thereof), and the moving portion can be controlled by the control section based on the charging position information. Therefore, the robot can automatically move to the position of the charging apparatus and can charge its battery.

The moving portion includes feet of the pet robot, a driving section driving the feet, and various detection switches provided at the feet or the like.

The pet robot also transmits image data through the communication section to the charging apparatus and receives a reception completion signal from the receiver. At the time, an erasure confirmation state to input erasure confirmation for the image data corresponding to the reception completion signal from the storage section is set by the setting section.

For example, the erasure confirmation state is expressed by the operation of the pet robot, e.g. by the state of an element forming the moving portion. While the erasure confirmation state is set, an input corresponding to the confirmation input is provided to the pet robot, so that a instruction to erase the image data can be given. More specifically, whether or not to erase the image data stored in the storage section corresponding to the reception completion signal can be selected, and image data that is no longer necessary can be selectively erased from the storage section of the pet robot.

The control section controls the moving portion so that the pet robot moves toward the charging apparatus when a predetermined condition is satisfied, and controls the communication section to transmit image data to the charging apparatus. At that time, whether or not the image data corresponding to a reception completion signal is erased is controlled based on the reception completion signal and a confirmation input by the setting section. In this way, the storage capacity of the storage section can be appropriately secured. For example, when the reception completion signal is received and an erasure confirmation state is set by the setting section, image data whose reception has been completed can be erased in response to a confirmation input.

Herein, the pet robot further includes the instruction detecting section detecting an image data transfer instruction being given by the user, for example, as a predetermined condition, and the time when the detecting section detects the instruction may be set as the predetermined condition. Alternatively, the predetermined timing can be the predetermined condition.

Note that the control section may prohibit data from being erased from the storage section when there is no such confirmation input by the setting section for a predetermined time period. Alternatively, the control section may control data to be erased from the storage section when there is no such confirmation input from the setting section for the predetermined time period.

The erasure confirmation state may correspond to a predetermined state of at least two elements forming the moving portion of the pet robot. More specifically, they are elements to move the pet robot. For example, when an element such as a foot, and an element such as the operation detecting section provided at the foot for detecting the operation of the user are in a predetermined state, this state can be regarded as the erasure confirmation state. At the time, in response to the detection of the state by the operation detecting section, a confirmation input can be provided.

Meanwhile, the charging apparatus transmits charging position information representing the position of the charging apparatus with its transmitting/receiving section. In this way, the pet robot can recognize and move toward the position of the charging apparatus for charging or transmitting image data stored in its storage section. The transmitting/receiving section receives image data transmitted from the communication section of the pet robot and transmits a reception completion signal representing the completion of the reception of the image data. In this way, the pet robot can be notified of the transfer of the image data to the charging apparatus.

The image data received by the transmitting/receiving section of the charging apparatus is stored in the storage section. Therefore, if the image data stored in the storage section is erased in response to the confirmation input to erase the image data from the storage section of the pet robot, the image data can still be saved in the storage section of the charging apparatus. In this way, image data obtained by image-capturing by the image-capturing section of the pet robot can appropriately be saved.

A second aspect of the invention provides a pet robot charging system according to the first aspect, further including a recording section recording an image on a recording material based on the image data.

According to the second aspect, the storage section provided in the charging apparatus allows an image captured by the image-capturing section of the pet robot to be recorded on a recording material such as a form and a printing paper sheet for output. More specifically, an image captured from the visual point of the pet robot can be checked as it is recorded on the recording material.

A third aspect of the invention, in the first or second aspect, further includes at the pet robot a detecting section for detecting a storage capacity of the storage section, the detecting section detecting, as the predetermined condition, whether or not the storage capacity is smaller than a predetermined amount.

According to the third aspect, with the detecting section detecting the storage capacity of the storage section provided in the pet robot, when the control section detects the storage capacity being smaller than a predetermined amount using the detecting section, the control section can control the pet robot to move to the charging apparatus based on charging position information, and the image data to be transmitted to the charging apparatus. Then, when a reception completion signal is received from the charging apparatus, the image data corresponding to the reception completion signal may be erased from the storage section in response to the reception completion signal and the confirmation input by the setting section, so that the capacity of the storage section can be appropriately secured.

A fourth aspect of the invention, in the first or second aspect, further includes at the pet robot a detecting section for detecting a storage capacity of the storage section, wherein the control section controls the moving portion based on the charging position information when the detecting section detects that the storage capacity is smaller than a predetermined amount and then controls the communication section to transmit the image data, so that the image data corresponding to the reception completion signal is erased from the storage section based on the transmission completion signal.

According to the fourth aspect, the memory capacity necessary for image-capturing can be secured.

A fifth aspect of the invention, in any one of the first to fourth aspects, further includes a remaining capacity detecting section for detecting a remaining capacity of the battery in the pet robot, wherein the remaining capacity detecting section detects, as the predetermined condition, whether or not the battery remaining capacity is smaller than a predetermined amount.

According to the fifth aspect, when the remaining capacity detecting section detects the remaining capacity of the battery being smaller than a predetermined amount, the control section controls the pet robot to move to the charging apparatus. Therefore, the pet robot can autonomously move to the charging apparatus for charging the battery when the battery must be charged.

A sixth aspect of the invention, in any of the first to fifth aspects, further includes at the charging apparatus for displaying a display section a captured image based on the image data received by the transmitting/receiving section.

According to the sixth aspect, an image captured by the image-capturing section of the pet robot can be checked on the side of the charging apparatus.

A seventh aspect of the invention, in anyone of the second to sixth aspects, further includes at the charging apparatus an image selection section for selecting the image data on which the image to be recorded by the recording section is based.

According to the seventh aspect, when there are a number of captured images, the user can select an image to be recorded on a recording material, and images that are not necessary are not recorded, in other words, a recording material can be saved.

A robot according to an eighth aspect of the invention includes an image-capturing section for capturing an image of an object, an image-capturing control section for controlling image-capturing by the image-capturing section in response to a predetermined image-capturing instruction, a storage section for storing image data obtained by image-capturing by the image-capturing section, a moving portion for autonomously traveling, a communication section for transmitting the image data, and a control section for controlling the moving portion to move to a predetermined output position to output the image data when a predetermined condition is satisfied, and then controlling the communication section to transmit the image data.

According to the eighth aspect, the robot includes the image-capturing section. The image-capturing section is controlled by the image-capturing control section, and image-capturing is carried out in response to a predetermined image-capturing instruction. Image data obtained by the image-capturing section is stored in the storage section. The robot can autonomously travel and output image data captured by the robot which may, for example, be a pet robot. The robot includes the moving portion for autonomously traveling, and the communication section for outputting image data. The moving portion and the communication section are controlled by the control section. The control section controls the moving portion to move to the output position when a predetermined condition is satisfied and then the communication section to output image data in the output position.

Therefore, the robot can autonomously move to the output position and output image data when the predetermined condition is satisfied.

A ninth aspect of the invention, in the eighth aspect, further includes a detecting section for detecting a storage capacity of the storage section, and the control section determines that the predetermined condition is satisfied when the storage capacity is smaller than a predetermined amount as the result of detection by the detecting section.

According to the ninth aspect, when the detecting section detects the storage capacity being smaller than a predetermined amount, the control section controls the robot to move to the output position. Therefore, the robot can autonomously move to the output position when the storage capacity of the storage section to store image data is not sufficient and output image data. In this way, the user does not have to be aware of whether the remaining storage capacity of the robot is sufficient or not.

A tenth aspect of the invention, in the eighth or ninth aspect, further includes a transmission instruction section for instructing the communication section to transmit the image data, and the control section determines that the predetermined condition has been satisfied when a transmission instruction is given by the transmission instruction section.

According to the tenth aspect, when the instruction section instructs image data to be transmitted, the control section controls the robot to move toward the output position. Therefore, when for example there is a transmission instruction for image data by the user, the robot autonomously moves to the output position and outputs the image data. Therefore, the user can make an instruction in a desired timing to output image data.

In an eleventh aspect of the invention, in any one of the eighth to tenth aspects, the communication section receives positional information representing the output position, and the control section controls the moving portion to move to the output position based on the received positional information.

According to the eleventh aspect, when for example the robot is not provided with predetermined positional information, the robot can move to the output position based on the received positional information.

A twelfth aspect of the invention, in anyone of the eighth to eleventh aspects, further includes a self position detecting section for detecting the position of itself, and the control section controls the moving portion based on the self position and the output position.

According to the twelfth aspect, the robot includes the self position detecting section to detect the position of itself. The self position detecting section may be for example a GPS. The control section controls the moving portion based on the position of itself, i.e., the position of the robot, and the output position. Therefore, the robot can confirm the distance and direction to the output position from itself based on the position of itself and the output position and can autonomously move to the output position.

A thirteenth aspect of the invention, in any one of the eighth to twelfth aspects, further includes a remaining capacity detecting section for detecting the remaining capacity of a battery provided as a power source, and the control section determines that the predetermined condition is satisfied when the remaining capacity of the battery is smaller than a predetermined amount as the detection result of the remaining capacity detecting section.

According to the thirteenth aspect, when the remaining capacity detecting section detects the remaining capacity of the battery being smaller than a predetermined amount, the control section controls the robot to move to the output position. Therefore, the robot autonomously starts to move to the output position when the remaining capacity of the battery is smaller than the predetermined amount. In this way, the robot moves toward the output position when the remaining capacity is insufficient, and this operation substantially notifies the user that the remaining capacity is insufficient. In this case, the capacity of the battery necessary for the movement is calculated based on the position of the robot and the output position, and the capacity is preferably set as a predetermined amount for the remaining capacity. In this way, the robot can be prevented from suddenly stopping operating as it is out of power supply and can safely move to the output position. The user does not have to check the remaining capacity at times in order to prevent the robot from thus stopping operating.

According to a fourteenth aspect of the invention, in the thirteenth aspect, the output position is at a charging position to charge the battery.

According to the fourteenth aspect, the output position is set as the charging position. As the output position is the charging position, the robot can both output image data and charge its battery during a single traveling operation.

According to a fifteenth aspect of the invention, in the thirteenth or fourteenth aspect, the communication section receives charging position information representing the charging position.

According to the fifteenth aspect, when for example there is not predetermined charging information, the robot can autonomously move to the charging position based on the received charging information.

According to a sixteenth aspect of the invention, in any one of the eighth to fifteenth aspects, the communication section receives a reception completion signal for transmission of the image data, and the control section erases the image data corresponding to the reception completion signal from the storage section.

According to the sixteenth aspect, when the communication section receives a reception completion signal, the control section erases image data corresponding to the reception completion signal from the storage section. In this way, an instruction of erasing the image data to the robot is not necessary, and the robot can secure the storage capacity of the storage section as it outputs the image data.

A receiving apparatus according to a seventeenth aspect of the invention includes a receiving section receiving image data output from an autonomously traveling robot at a predetermined output position, and a storage section for storing the image data received at the receiving section.

According to the seventeenth aspect of the invention, the receiving apparatus can hold image data captured by the robot.

An eighteenth aspect of the invention, in the seventeenth aspect, further includes a positional information transmitting section for transmitting positional information representing the output position.

According to the eighteenth aspect, the receiving apparatus can transmit positional information as information representing the position of itself to the robot. Therefore, the robot can move to the receiving apparatus based on the positional information, so that the receiving apparatus can receive image data from the robot.

According to a nineteenth aspect of the invention, in the seventeenth or eighteenth aspect, further includes a charging section for charging a battery provided in the robot.

According to the nineteenth aspect, the receiving apparatus can charge the battery mounted in the robot.

A twentieth aspect of the invention, in the nineteenth aspect of the invention, the positional information transmitting section transmits charging position information representing a charging position as the output position.

According to the twentieth aspect, the positional information transmitting section transmits the charging position information. As the output position information is the charging position information, the receiving apparatus can transmit the charging position information as the information representing the position of itself to the robot. Therefore, the robot can move to the receiving apparatus based on the charging position information, so that at the receiving apparatus, image data can be output while the battery mounted in the robot can be charged.

According to a twenty-first aspect of the invention, in any one of the seventeenth to twentieth aspects, further includes a completion signal transmitting section for transmitting a reception completion signal when the reception of the image data by the receiving section has been completed.

According to the twenty-first aspect, the robot can determine the completion of the transmission of the image data in response to the received reception completion signal.

BRIEF DESCRIPTION OF THE DRAWINGS

FIG. 11 is a flowchart for use in illustration of an example of the process flow in the output station according to the second embodiment.

DETAILED DESCRIPTION OF THE PREFERRED EMBODIMENTS

One embodiment of the invention will now be described in detail in conjunction with the accompanying drawings.

First Embodiment

Figure 1:
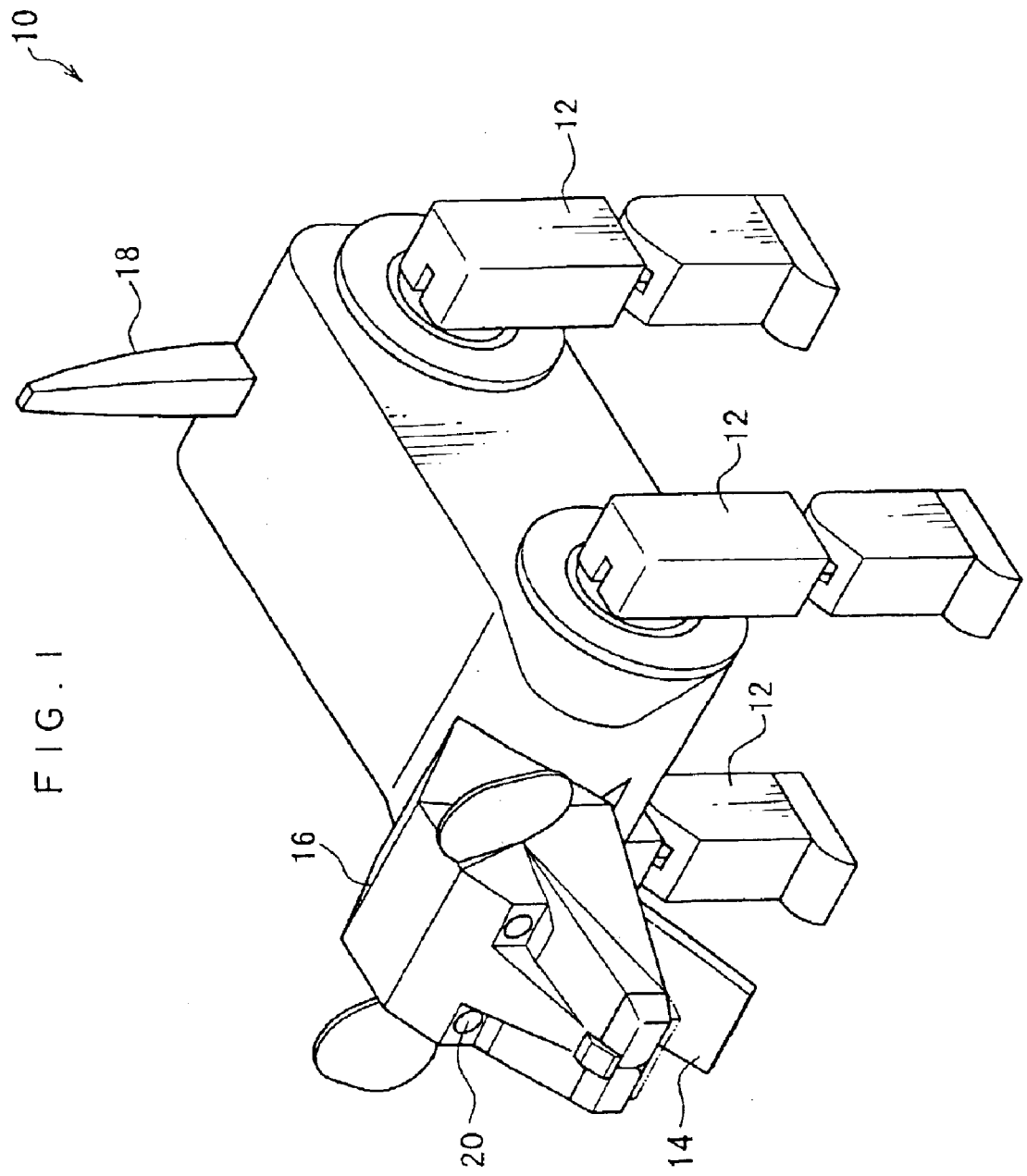
FIG. 1 is a perspective view showing a general overview of a pet robot according to a first embodiment of the invention.

FIG. 1 shows a general overview of a pet robot 10 according to the embodiment of the invention. The pet robot 10 has the appearance of a four-footed animal such as a dog and a cat. Note that the pet robot 10 may have the appearance of an insect or the like other than the animal. The pet robot 10 according to the embodiment is capable of capturing an image from the visual point of the pet robot 10.

The pet robot 10 has four feet 12 to travel on, and the junctions of the feet 12 are movable. These junctions are driven by a motor or the like that will be described, so that the robot can autonomously travel. Its mouth 14, head (neck) 16, and tail 18 are also capable of moving and also driven by the motor or the like that will be described.

In the eye level of the pet robot 10, an image sensor 20 such as CCD for capturing images from the visual point of the pet robot 10 is provided.

Figure 2:
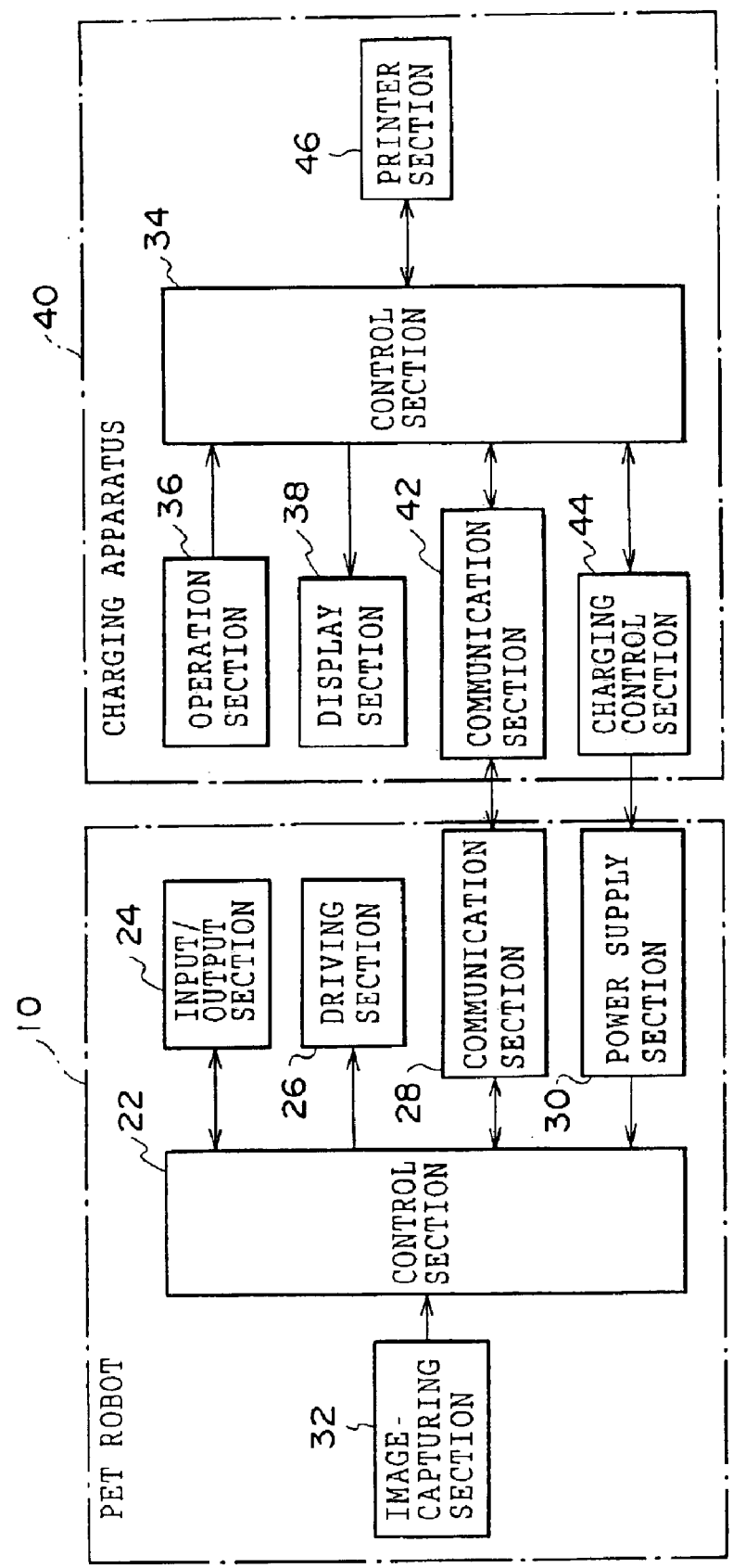
FIG. 2 is a functional block diagram showing the pet robot charging system according to the first embodiment on a function-basis.

FIG. 2 is a functional block diagram showing a pet robot charging system according to the embodiment on a function-basis. The system includes the pet robot 10 and a charging apparatus 40 to charge a battery as a power source for the pet robot 10.

The function sections of the pet robot 10 are a control section 22, a driving section 26, an input/output section 24, a power supply section 30, an image-capturing section 32, and a communication section 28. The control section 22 calculates parameters representing the "emotion," "physical condition," and the like of the pet robot 10 in response to user's actions to the pet robot 10 and carries out control to move the head 16, feet 12, mouth 14, tail 18 and the like of the pet robot 10 based on the parameters. The driving section 26 moves these body parts of the pet robot 10 under the control of the control section 22. The input/output section 24 detects the user's actions or call to the pet robot 10. The power supply section 30 is a power source for the pet robot 10. The image-capturing section 32 takes images from the visual point of the pet robot 10. The communication section 28 transmits images captured by the image-capturing section 32 or communicates with the charging apparatus 40.

The control section 22 calculates parameters representing the "emotion" or "physical condition" of the pet robot 10 in response to the user's action to the pet robot 10 detected by the input/output section 24, and controls the driving section 26 based on the parameters to control the operation of the pet robot 10 accordingly. In this way, the pet robot 10 can be moved as if it is a living pet animal. When the input/output section 24 detects the user's action to the pet robot 10 such as stroking the head 16, touching the foot 12 and patting the head 16, the pet robot 10 is controlled to express its "emotion" such as affection and fear in response to the action by the user. In this way, the robot can be moved as if it is a living pet animal.

The image-capturing section 32 takes an image in response to a predetermined condition detected by the input/output section 24 (for example in response to detection of the user's action corresponding to an instruction to capture an image).

The communication section 28 transmits an image captured by the image-capturing section 32 to the charging apparatus 40 when the image should be output.

The power supply section 30 is a power source for the pet robot 10, in other words, the pet robot 10 operates by power supplied from the power supply section 30.

Note that the image-capturing section 32 corresponds to the image-capturing section according to the invention. The control section 22 corresponds to the image-capturing control section and the control section according to the invention. The driving section 26, the power supply section 30, and the communication section 28 correspond to the moving portion, the battery, and the communication section according to the invention, respectively.

Meanwhile, the functional sections of the charging apparatus 40 are a printer section 46, a communication section 42, a display section 38, an operation section 36, a charge control section 44, and a control section 34. The printer section 46 records an image on a recording material based on the image captured by the image-capturing section 32 of the pet robot 10. The communication section 42 receives a captured image transmitted from the communication section 28 of the pet robot 10 or communicates with the pet robot 10. The display section 38 displays the image captured by the image-capturing section 32. The operation section 36 carries out various operations such as selection of an image to be displayed at the display section 38 and an image to be produced into a print by the printer section 46. The charge control section 44 controls charging such as supply of power to the power supply section 30 of the pet robot 10. The control section 34 collectively controls the above functions.

The printer section 46 carries out a predetermined image processing to the image captured by the image-capturing section 32 of the pet robot 10, and records the captured image on the recording material such as a form and a printing paper sheet to produce a print. More specifically, the image captured from the visual point of the pet robot 10 can be output by the printer section 46 in the charging apparatus 40.

The communication section 42 communicates with the pet robot 10 when the power supply section 30 in the pet robot 10 is to be charged, or an image recorded in the robot 10 is to be output, and transmits information for the pet robot 10 to use for searching for the charging apparatus 40. When the pet robot 10 reaches the charging apparatus 40, the image recorded in the pet robot 10 can be received at the communication section. Note that a captured image recorded in the pet robot 10 may be received through a wire or by wireless. If it is received through a wire, as disclosed in JP-A No. 2001-125641, for example, the pet robot 10 may move to be connected to the charging apparatus 40 for communication.

The display section 38 displays images captured by the image-capturing section 32 of the pet robot 10, and also displays images so that an image to be produced into a print by the printer section 46 is selected. More specifically, the user may select an image to be produced into a print among images captured by the pet robot 10 while viewing the images displayed at the display section 38. In addition, the display section 38 can display the charge state when the power supply section 30 of the pet robot 10 is charged.

The operation section 36 can carry out various operations such as selection of an image to be displayed at the display section 38, selection of an image to be produced into a print by the printer section 46, display switching at the display section 38, and setting conditions for communication by the communication section 42.

The control section 34 controls charging of the power supply section 30 of the pet robot 10, and outputting, which includes displaying and recording of images captured by the image-capturing section 32 of the pet robot 10, in other words, carries out the function of charging the power supply section in the pet robot 10 and the function of outputting an image captured by the image-capturing section 32 of the pet robot 10.

Note that the communication section 42, the charge control section 44, and the printer section 46 correspond to the transmitting/receiving section, the charging section, and the recording section according to the invention, respectively.

Figure 3:
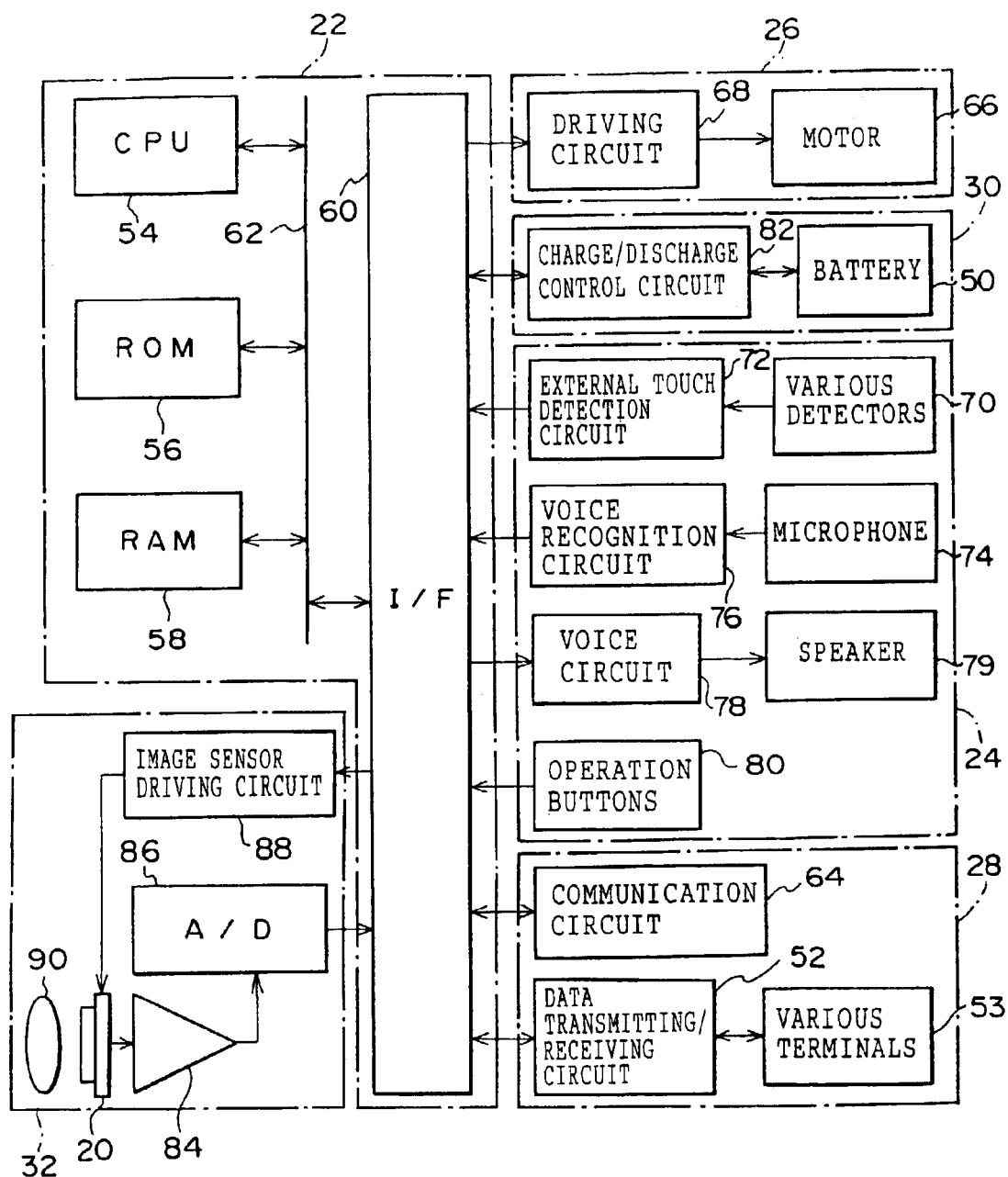
FIG. 3 is a block diagram showing the electrical configuration of the pet robot according to the first embodiment.

Now, the electrical configuration of the pet robot 10 and the charging apparatus 40 according to the embodiment that activate the above functions will be described. As shown in FIG. 3, the control section 22 of the pet robot 10 according to the embodiment includes a microcomputer having a CPU 54, a ROM 56, a RAM 58 and an interface (I/F) 60 connected to a bus 62 in such a manner that they can communicate with each other. More specifically, the pet robot 10 has its operation collectively controlled by the CPU 54.

The ROM 56 stores various programs to allow the pet robot 10 to operate, various programs to allow images to be captured from the visual point of the pet robot 10, parameters representing the "emotion," "physical condition," and the like of the pet robot 10 to allow the pet robot 10 to express and operate based on the "emotion," "physical condition," and the like. The RAM 58 stores image data (images) captured by the image sensor 20 that will be described. Note that the RAM 58 corresponds to the storage section according to the invention.

The I/F 60 is connected through a driving circuit 68 with a motor 66 as the driving section 26 that drives the feet 12, the head 16, the mouth 14, and the tail 18 of the pet robot 10. The motor 66 is driven based on the operation result of the CPU 54, so that the pet robot 10 carries out the operation according to its "emotion," "physical condition," and the like.

When the user acts on the pet robot 10 at its foot 12, head 16, mouth 14, tail 18 and the like (actions such as stroking the head 16, touching the foot 12, and pulling the tail 18), various detectors 70 provided to detect these actions and connected to the I/F 60 through an external touch detection circuit 72 can detect the user's action whenever the user touches the pet robot 10. The various detectors 70 may include an encoder to detect the movement of the feet 12 or the head 16 caused by the user's action to the pet robot 10 and various switches to detect stroking on the head 16 or the like. Note that the various detectors 70 may include a sensor provided at the mouth 14 to detect a print to be output from the charging apparatus 40, which will be described.

The pet robot 10 includes a microphone 74 serving as its ears connected to the I/F 60 through a voice recognition circuit 76. When for example the user calls the registered name of the pet robot 10, the voice can be recognized.

The pet robot 10 also has a speaker 79 connected to the I/F 60 through a voice circuit 78, and the cry of the pet robot 10 can be output therefrom.

More specifically, the CPU 54 obtains parameters representing the "emotion," "physical condition," and the like of the pet robot 10 stored in the ROM 56 based on the result of detection by the various detectors 70 or the voice recognition circuit 76, and then drives the feet 12, the head 16, the mouth 14, and the tail 18 based on the parameters, so that the "emotion," "physical condition," and the like of the pet robot 10 can be expressed. Based on parameters for the pet robot 10 according to the embodiment, for example, the pet robot is supposed to be happy and acts to show the cheerfulness when the user strokes the head 16.

Note that the pet robot 10 has operation buttons 80 connected to the I/F 60 for operations such as various settings for the pet robot 10 (such as turning on/off the power supply of the pet robot 10 and an instruction to capture an image).

The external touch detection circuit 72, the various detectors 70, the voice recognition circuit 76, the microphone 74, the voice circuit 78, the speaker 79, and the operation buttons 80 serve as the input/output section 24 as described above.

As described above, the pet robot 10 is capable of capturing images from the visual point of the pet robot 10, and the image-capturing is carried out by the image sensor 20 such as a CCD. The image sensor 20 is provided at the eye level of the pet robot 10. Note that the image sensor 20 also serves to capture an image for recognizing obstacles around the pet robot 10 in addition to the above image-capturing function. The image sensor 20 may be provided, for example, in the mouth 14 other than at the eye level of the pet robot 10, and the mouth 14 may be opened at the time of capturing an image.

The image sensor 20 is connected to the I/F 60 through an amplifier 84 and an A/D converter 86 and driven by an image sensor driving circuit 88 connected to the I/F 60. The image sensor 20 is provided with a lens 90 for forming an image of an object, and the lens 90 forms an object image at the image sensor 20. More specifically, the image sensor 20 captures an image of an object with the lens 90, so that image data for the image from the visual point of the pet robot 10 can be obtained. Note that a pan focus lens may be applied as the lens 90, while another kind of lens such as a zoom lens may be applied. The image sensor 20, the lens 90, the amplifier 84, the A/D converter 86, and the image sensor driving circuit 88 serve as the above-described image-capturing section 32.

When the image sensor 20 of the pet robot 10 captures an image, the user may operate the operation button 80 to initiate the operation. Alternatively, the user may act upon the foot 12, head 16, tail 18, or the like of the pet robot 10 to initiate the operation or automatic image-capturing may take place in predetermined timings.

As described above, the pet robot 10 is electrically driven. Therefore, the pet robot 10 needs the power supply section 30 as its power source as described above. The pet robot 10 according to the embodiment has a battery 50 as the power supply section 30. The battery 50 is connected to the I/F 60 through a charge/discharge circuit 82. The charge/discharge circuit 82 detects the remaining capacity of the battery 50, or controls the amount of power to be fed to the battery 50 during charging. In this way, the battery 50 is monitored as required so that the battery 50 can be appropriately charged/discharged.

As the above-described communication section 28, the communication circuit 64 to receive information to specify the position of the charging apparatus 40 is connected to the I/F 60, various terminals 53 to transmit image data obtained by image-capturing by the image sensor 20 to the charging apparatus 40 are connected to the I/F 60 through the data transmitting/receiving circuit 52. Note that the various terminals 53 may be a USB terminal (Universal Serial Bus) or the like, while a terminal that allows the pet robot 10 to move to and easily connect with the charging apparatus 40 (for example, by the method of connecting between the pet robot and the charging apparatus as disclosed by JP-A No. 2001-125641) may be applied.

Figure 4:
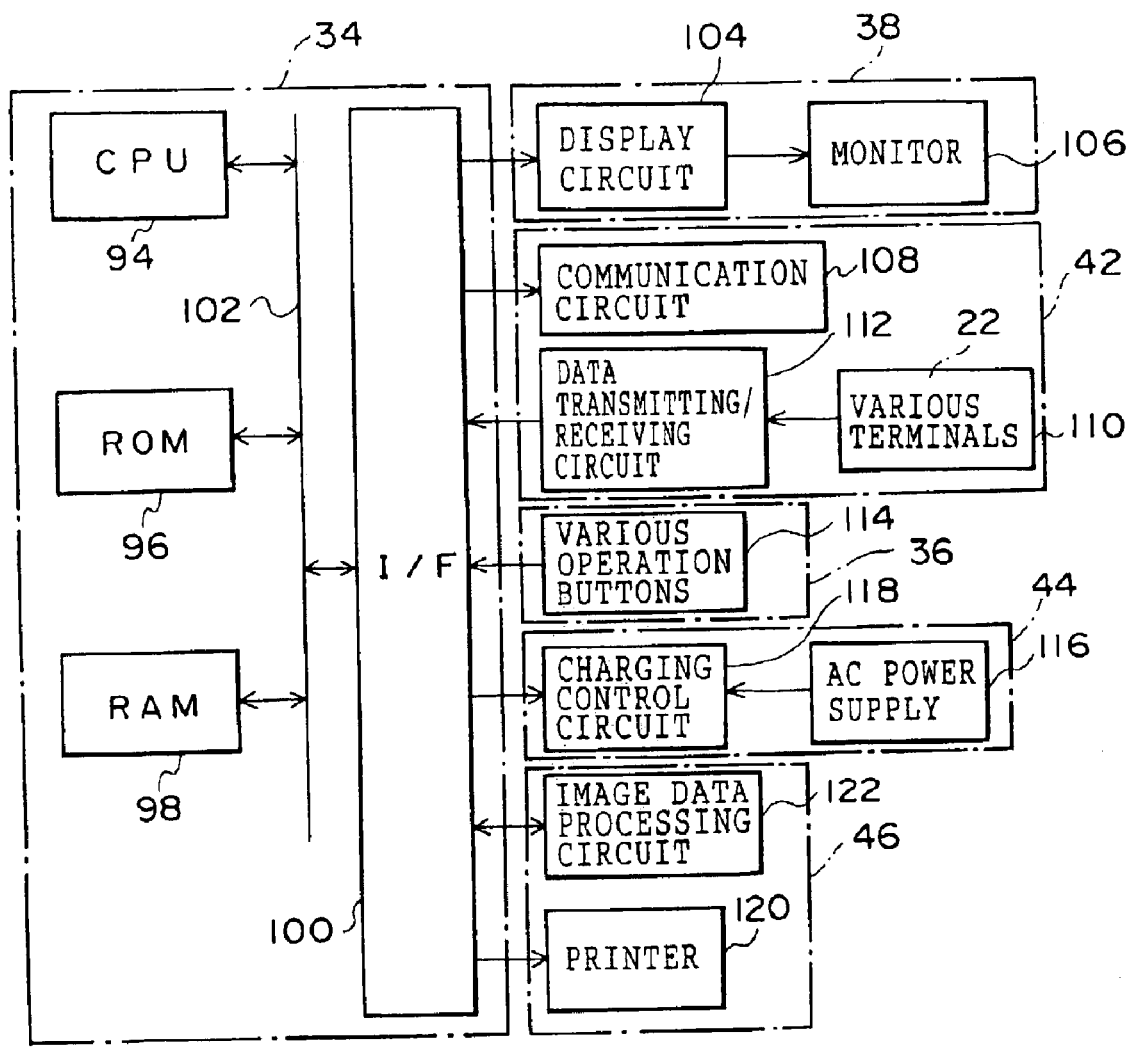
FIG. 4 is a block diagram showing the electrical configuration of a charging apparatus according to the first embodiment.

Meanwhile, as shown in FIG. 4, the control section 34 of the charging apparatus 40 according to the embodiment includes a microcomputer having a CPU 94, a ROM 96, a RAM 98, and an interface (I/F) 100 connected to a bus 102 such that they can communicate with each other. More specifically, the charging apparatus 40 is also collectively controlled by the CPU 94.

The ROM 96 stores image processing conditions for various kinds of image processing to image data obtained by image-capturing by the pet robot 10 and various programs to allow a printer 120 for producing a print to operate. The RAM 98 stores image data or the like transmitted from the pet robot 10. Note that the RAM 98 corresponds to the storage section according to the invention.

The I/F 100 is connected through a display circuit 104 with a monitor 106 as the above-described display section 38 that displays an image based on image data captured by the pet robot 10. In this way, images captured by the pet robot 10 can be displayed.

The I/F 100 is connected with the printer 120 as the above printer section 46 that records an image based on the image data obtained by the image-capturing by the pet robot 10 on a recording material such as a form and a printing paper sheet and produces a print thereof. In this way, images captured by the pet robot 10 can be output.

As the printer 120, a printer capable of forming an image by exposing a photosensitive material with light may be applied, and the recording material (photosensitive material) in this case may be a film sheet such as an instant film that develops a developing solution when it is discharged after being exposed to light.

The image data obtained by image-capturing by the pet robot 10 is subjected to predetermined image processing at an image data processing circuit 122 connected to the I/F 100. The image data processing circuit 122 reads out image processing conditions stored in the ROM 96 and carries out various kinds of image processing to the image data obtained from the pet robot 10. The image data processing circuit 122 carries out processing such as color correction, γ correction, and Y/C conversion. The image data processing circuit 122 also carries out image processing to an image based on image data to be displayed at the monitor 106 so that the image is adapted to display at the monitor 106.

In the charging apparatus 40, various operation buttons 114 as the above operation section 36 for various settings and operations for the charging apparatus 40 (such as an instruction to produce a print based on image data obtained from the pet robot 10, selection of image data to be produced into a print, and selection of image data to be displayed) are connected to the I/F 100. More specifically, in response to the operation of the operation buttons 114, a captured image is displayed at the monitor 106 or a print is produced by the printer 120.

In the charging apparatus 40, a charge control circuit 118 to charge the battery 50 of the pet robot 10 is connected to the I/F 100 as the charge control section 44, so that the battery 50 of the pet robot 10 can be charged. The charge control circuit 118 is connected to an AC power supply (commercial power source) 116 as a power source for charging the battery 50 of the pet robot 10. The battery 50 of the pet robot 10 is charged by the power of the AC power supply 116. Note that the AC power supply 116 is also used as a power source for the charging apparatus 40, in other words, as a power supply for driving the printer 120 or for display at the monitor 106.

As the communication section 42 of the charging apparatus 40, a communication circuit 108 to transmit a signal or the like representing the positional information of the charging apparatus 40 to the pet robot 10 is connected to the I/F 100, while various terminals 110 for receiving image data from the pet robot 10 or transmitting image data obtained from the pet robot 10 to an external computer or the like are connected to the I/F 100 through the data transmitting/receiving circuit 112. Note that the various terminals 110 may be a USB terminal similarly to the various terminals 53 of the pet robot 10. In addition, a terminal that allows the pet robot 10 to move to and easily connect with the charging apparatus 40 may be applied.

An example of the operation of the pet robot 10 as described above will be described with reference to the flowchart of FIG. 5.

When the power supply of the pet robot 10 is turned on, initialization processing is carried out in step 200. The initialization is a processing to regain the state before the power supply is off, and data saved in a non-volatile memory or the like (not shown) at the final processing when the power supply is turned off is read and the state before the power supply is turned off is regained.

In step 202, detection of external contact, voice recognition, and detection of an operation instruction is carried out. More specifically, the user's action to the pet robot 10 is detected by the various detectors 70, the microphone 74, the operation buttons 80, and the like.

In step 204, depending upon the result of the user's action to the pet robot 10 detected in step 202, the status value to operate the pet robot 10 is calculated. More specifically, the parameters representing the "emotion" or the like in response to the user's action to the pet robot 10 is calculated as the status value. For example, when the user's stroking of the head 16 of the pet robot 10 is detected, the parameter representing the cheerfulness of the pet robot 10 is calculated as the status value.

Then, in step 206, based on the calculated status value, the motor 66 or the like is driven by the driving circuit 68. In other words, the pet robot 10 is controlled to act in response to the user's action to the pet robot 10. In this way, the pet robot can be controlled to act as if it is a living pet animal.

In step 208, the status values representing the "emotion," the "physical condition," and the like of the pet robot 10 at present are stored/updated in the RAM 58.

In step 210, it is determined whether or not an image-capturing instruction has been given. The determination is made based on whether or not the user has operated the operation button 80 provided at the pet robot 10 for making an image-capturing instruction.

When the result of the determination in step 210 is affirmative, the process proceeds to step 212, in which the image sensor 20 captures an image, the image data obtained by the operation is stored in a memory such as the RAM 58 and the process proceeds to step 214. When the result of the determination in step 2/10 is negative, the process directly proceeds to step 214.

In step 214, it is determined whether the capacity of a memory such as the RAM 58 is small or whether or not an instruction of recording a captured image (image data transfer instruction) has been made. More specifically, it is determined whether or not the capacity of image data obtained by image-capturing has reached a predetermined capacity, or whether or not the user's instruction of transferring an image (image data obtained by image-capturing) to the charging apparatus 40 has been made using the operation button 80. When the result of the determination is negative, the process proceeds to step 216.

In step 216, it is determined whether or not the power supply is off. More specifically, it is determined whether or not the user's instruction to turn off the power supply has been made. If the result of determination is affirmative, the process proceeds to step 218, and the termination processing is carried out. The status values representing the current "emotion," and "physical condition," and the like of the pet robot 10 stored in the RAM 58 are stored in the non-volatile memory or the like that is not shown, the power supply is turned off, and the series of process steps terminate.

Meanwhile, when the result of the determination in step 214 is affirmative, the process returns to step 220, and the process of searching for the charging apparatus that will be described in order to produce a print of the image data. Then, the process returns to step 202, and the above-described processing is repeated.

If the result of determination in step 216 is negative, the process proceeds to step 222, and it is determined whether or not a fixed amount of time has passed. The fixed amount of time can be set for example by operating the operation button 80. In this way, the pet robot 10 can be charged, or stored image data can be printed when a fixed amount of time has passed.

When the result of the determination in step 222 is affirmative, the process of searching for the charging apparatus is carried out, the process returns to step 202, and the above process is repeated.

When the result of the determination in step 222 is negative, the process proceeds to step 224, and it is determined whether or not the remaining capacity of the battery is smaller than a predetermined value. More specifically, the capacity of the battery 50 is detected by the charge/discharge control circuit 82, and it is determined whether or not the result of detection is smaller than the predetermined capacity. If the result of the determination is affirmative, the process proceeds to step 220, the process of searching for the charging apparatus that will be described is carried out in order to charge the battery 50. Then, the process returns to step 202 and the above process is repeated. When the result of the determination in step 224 is negative, the process directly returns to step 202, and the above processing is repeated. Note that step 224 corresponds to the detecting section according to the invention.

As described above, the pet robot 10 according to the embodiment can detect the user's action to itself and changes the status values representing its "emotion," "physical condition," and the like, so that the pet robot 10 is allowed to act as if it is a living pet animal.

Figure 6:
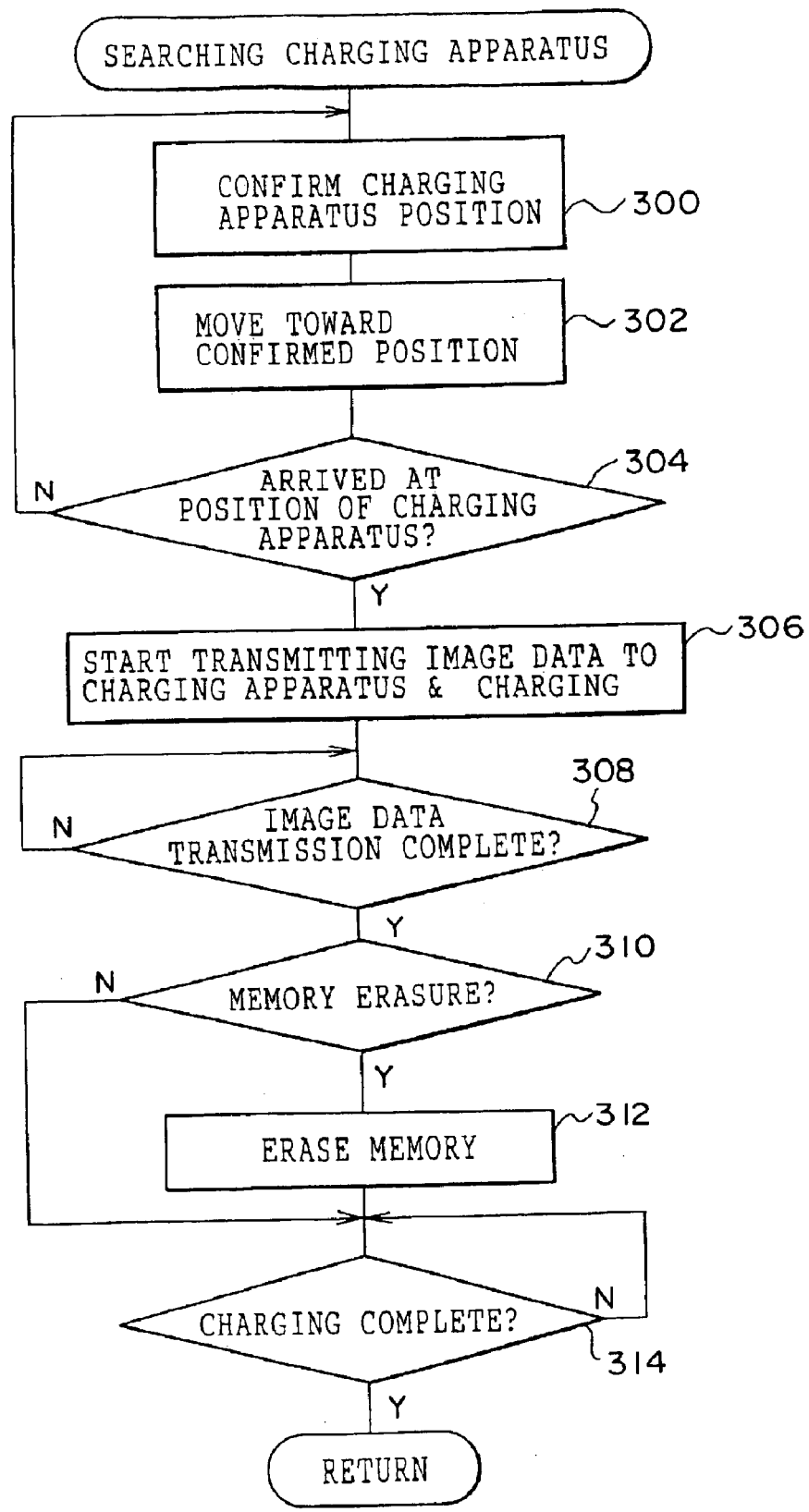
FIG. 6 is a flowchart for use in illustration of the process of searching for the charging apparatus.

The process of searching for the charging apparatus as described above will be described in conjunction with the flowchart of FIG. 6.

In step 300, the position of the charging apparatus 40 is confirmed. More specifically, the positional information transmitted from the charging apparatus 40 is received, so that the direction and the distance to the charging apparatus 40 are confirmed. The position of the charging apparatus 40 may be confirmed for example by a method disclosed by JP-A NO. 2001-125641.

In step 302, the pet robot moves in the confirmed direction toward the charging apparatus 40. More specifically, the motor 66 is driven by the driving circuit 68, and the pet robot autonomously travels toward the charging apparatus 40.

In step 304, it is determined whether or not the pet robot has reached the position of the charging apparatus 40. This can be determined based on a connection signal generated when the pet robot 10 autonomously travels to the charging apparatus 40 and autonomously connects between the various terminals 53 of the pet robot 10 and the various terminals 110 of the charging apparatus 40. Alternatively, it can be determined by the communication between the pet robot 10 and the charging apparatus 40.

When the result of the determination in step 304 is negative, the process returns to step 300 and the above processing is repeated until the determination in step 304 is affirmative.

When the result of the determination in step 304 is affirmative, the process proceeds to step 306, and image data stored in the pet robot 10, i.e., image data obtained by image-capturing by the image sensor 20 of the pet robot 10 is transmitted to the charging apparatus 40, and the battery 50 of the pet robot 10 starts to be charged.

In step 308, it is determined whether or not transmission of the image data stored in the pet robot 10 is completed. The process stands by until the result of the determination is affirmative, and then proceeds to step 312. Note that the result of the determination in step 308 becomes affirmative when a reception completion signal from the charging apparatus 40 is received.

Then in step 310, it is determined whether or not to erase the image data stored in a memory such as the RAM 58 that has been transmitted. At the time, the pet robot 10 confirms erasure to attain the erasure confirmation state for the image data in the memory. The erasure confirmation operation is carried out by controlling a foot, a switch or the like provided at the foot of the pet robot 10 to attain a predetermined state. For example, the state of image data erasure confirmation state can be expressed by predetermined movement such as raising the foot 12 or the like. The switch or the like provided at the foot in the image data erasure confirmation state can be used to make confirmation input for confirming image data erasure. More specifically, in the step, it is confirmed that the image data stored in the pet robot 10 is erased.

The determination in step 310 is carried out by detecting whether or not a predetermined action such as patting the head of the pet robot 10 is taken by the user within a predetermined period after a completion notification representing the completion of the transmission of the image data is received from the charging apparatus 40. When no such user action is taken, the result of the determination in step 310 is affirmative. Meanwhile, the result of the determination in step 310 may be set as affirmative when the predetermined action such as patting the head of the pet robot 10 is taken within a predetermined period after receiving the notification from the charging apparatus 40.

Note that step 310 corresponds to the setting section according to the invention.

When the result of the determination in step 310 is affirmative, the process proceeds to step 312, and when the result is negative, the process directly proceeds to step 314.

In step 312, image data stored in the RAM 58 is erased. More specifically, when the memory capacity is too small to allow image-capturing, the image sensor 20 of the pet robot 10 can resume image-capturing after data in the memory is erased in the step. Note that according to the embodiment, with respect to the image data stored in the memory, the image data may be entirely erased once all the image data is transferred. Alternatively, image data may be erased every time the data is transferred.

In step 314, it is determined whether or not charging of the battery 50 is completed. The determination is made by the charge/discharge control circuit 82 based on whether or not the capacity of the battery 50 has reached a predetermined value. When the result of the determination in step 314 is negative, the process stands by until the result is affirmative, and the series of steps in the process of searching for the charging apparatus terminate.

In this way, the pet robot 10 according to the embodiment can automatically move to the charging apparatus 40 based on the remaining memory capacity or in response to an image transfer instruction from the user. Meanwhile, the pet robot 10 can transfer image data to the charging apparatus 40 and selectively erase image data stored in the pet robot 10 based on an erasure confirmation input. In this way, images captured by the pet robot 10 can be saved in the pet robot 10 and the charging apparatus 40 in a preferable manner.

Image data can be transferred to the charging apparatus 40 when the battery 50 of the pet robot 10 is charged, and in this way, the image data stored in the pet robot 10 can efficiently be transferred to the charging apparatus 40.

Note that according to the embodiment, whether or not to erase image data is determined in step 310, but image data already transmitted can be erased entirely. When the memory capacity of the RAM 58 or the like of the pet robot 10 is fully used, all the image data already transmitted may be erased.

Figure 7:
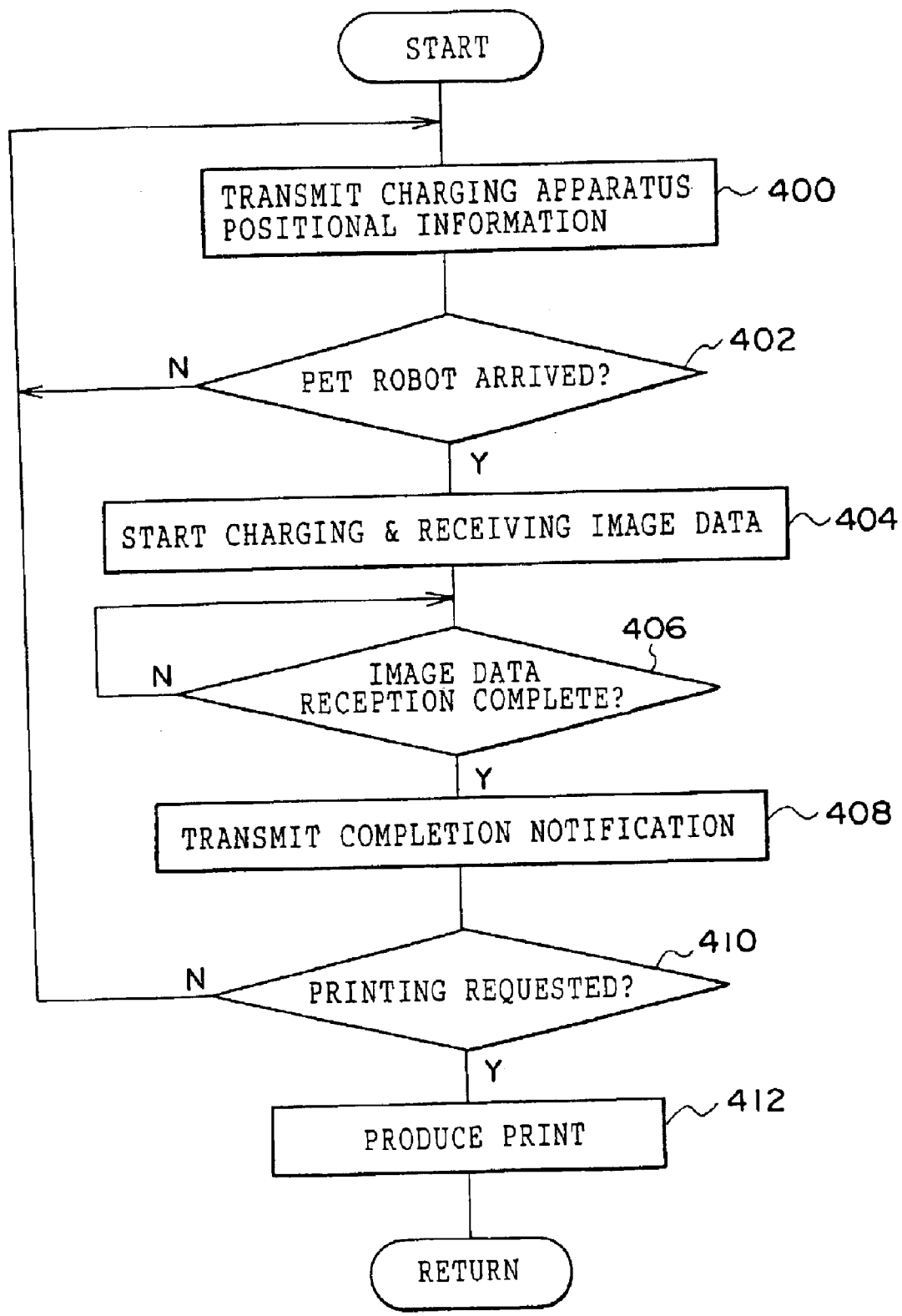
FIG. 7 is a flowchart for use in illustration of an example of the process flow in the charging apparatus according to the first embodiment.

Now, an example of the process flow in charging apparatus 40 will be described in conjunction with the flowchart of FIG. 7.

In step 400, the positional information of the charging apparatus 40 is transmitted to the pet robot 10.

In step 402, it is determined whether or not the pet robot 10 has reached the charging apparatus 40. Similarly to step 304 in the process of searching for the charging apparatus, the determination is made based on a connection signal generated when the pet robot 10 autonomously travels to the charging apparatus 40 and autonomously connects between the various terminals 53 of the pet robot 10 and the various terminals 110 of the charging apparatus 40. Alternatively, it can be determined based on the communication between the pet robot 10 and the charging apparatus 40.

When the result of the determination in step 402 is negative, the process returns to step 400, and the above processing is repeated until the result of the determination in step 402 becomes affirmative.

When the result of the determination in step 402 is affirmative, the process proceeds to step 404, and the battery 50 of the pet robot 10 starts to be charged, and image data stored in the pet robot 10 is received. More specifically, the battery 50 is fed by the charge control circuit 118, and the image data is received from various terminals 110. Although, in the present embodiment, the image data transmitted from the various terminals 53 of the pet robot 10 is received at the various terminals 110 of the charging apparatus 40, the invention is not limited to this embodiment, and the communication circuits 64 and 108 may communicate with each other so that the image data can be received by wireless.

In step 406, it is determined whether or not the image data reception is completed, and the process stands by until the result of the determination is affirmative, and proceeds to step 408.

In step 408, a completion notification representing the completion of image data reception is transmitted to the pet robot 10.

In step 410, it is determined whether or not a printing instruction has been made. The determination is made based on whether or not a printing instruction has been made using the various operation buttons 114 of the charging apparatus 40. If the result of the determination in step 410 is negative, the process returns to step 400 and the above process is repeated.

When the result of the determination in step 410 is affirmative, the process proceeds to step 412, and a print is produced. More specifically, predetermined image processing is carried out at the image data processing circuit 122 on the image data received from the pet robot 10. Based on the image data after the image processing, the image is recorded on a recording material by the printer 120 and a print is produced. Then, the series of process steps are returned. More specifically, a print of a captured image can be produced in response to a printing instruction from the user.

Note that the produced print may be carried to the user by the pet robot 10 in its mouth 14.

As in the foregoing, in the pet robot charging system according to the embodiment, image data captured by the pet robot 10 is transmitted to the charging apparatus 40 and stored therein. Then, the image data that has been already been transmitted can be selectively erased from the memory of the pet robot 10 in response to the image data erasure confirmation. Therefore, the memory capacity of the pet robot 10 can be appropriately utilized, while obtained image data can be appropriately saved.

Since the charging apparatus 40 can produce a print based on image data, a print can be produced based on image data without a printer 120 or the like at the pet robot 10. The pet robot 10 that allows captured images to be printed can be more compact.

Note that according to the embodiment, the battery 50 of the pet robot 10 is charged when image data stored in the pet robot 10 is transferred to the charging apparatus 40. However, the invention is not limited to this embodiment and alternatively only the image data transfer may be carried out.

According to the embodiment, image data transmitted to the charging apparatus 40 is stored in the RAM 98, but the invention is not limited to this embodiment and a non-volatile memory for example may be provided at the charging apparatus 40 and the data may be stored in the non-volatile memory. Image data captured by the pet robot 10 is stored in the RAM 58, but the invention is not limited to this embodiment, and, for example, a non-volatile memory may be provided in the pet robot 10 to store the image data similarly to the above.

In addition, according to the above embodiment, the monitor 106 is provided at the charging apparatus 40, but the monitor 106 may be provided at the pet robot 10 and images captured by the pet robot 10 may be checked at the pet robot side. Alternatively, the monitor may be provided at both of the pet robot 10 and the charging apparatus 40.

Second Embodiment

In the above first embodiment, the present invention is applied to the system including the pet robot 10 and the charging apparatus 40. According to the second embodiment, the invention is applied to an output station 41 provided separately from the pet robot 10 to output image data from the pet robot 10. Note that the second embodiment has substantially the same structure as that of the first embodiment, and therefore the same elements are denoted by the same reference numerals and will not be detailed.

Figure 8:
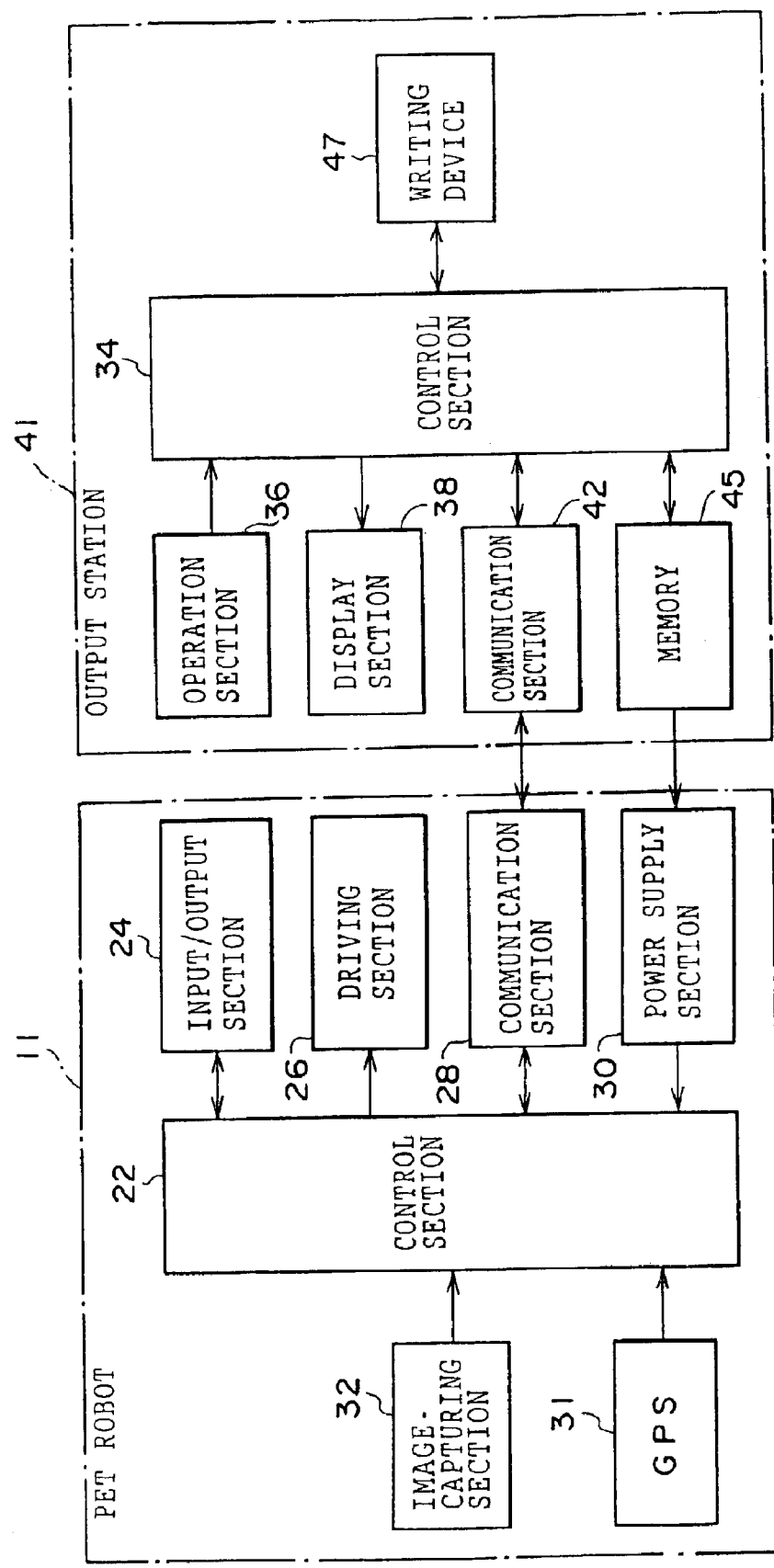
FIG. 8 is a functional block diagram showing a robot system according to a second embodiment of the invention on a function-basis.

As shown in FIG. 8, a pet robot 11 according to the present embodiment further includes a GPS (Global Positioning System) 31 that is connected to a control section 22 provided in the pet robot 11. The GPS 31 is used to obtain the current positional information of itself, i.e., the pet robot 11. The GPS 31 receives signals from one or more GPS satellites and provides the positional information including the current time and the latitude and longitude of the pet robot 11 based on the received signal.

Note that the other structure of the pet robot 11 is the same as that of the pet robot 10 and will not be detailed. The pet robot 11 according to the embodiment outputs image data at the output station 41.

The output station 41 has the same configuration as that of the charging apparatus 40 and includes a control section 34, an operation section 36, a display section 38, and a communication section 42. Note that according to the embodiment, the pet robot 11 does not have to be charged, and therefore the output station 41 can do without the charge control section 44. However, the charge control section 44 may be provided as the case may be. According to the embodiment, the printer section 46 is not provided, while it is understood that the invention can be applied to the case with the printer section 46.

The control section 34 includes an image memory 45 to store image data. The image memory 45 is connected to the control section 34. The output station 41 includes a writing device 47 to write image data stored in the image memory 45 to a recording medium. The writing device 47 is connected to the control section 34.

Note that the GPS 31 corresponds to the self position detecting section according to the invention.

Figure 9:
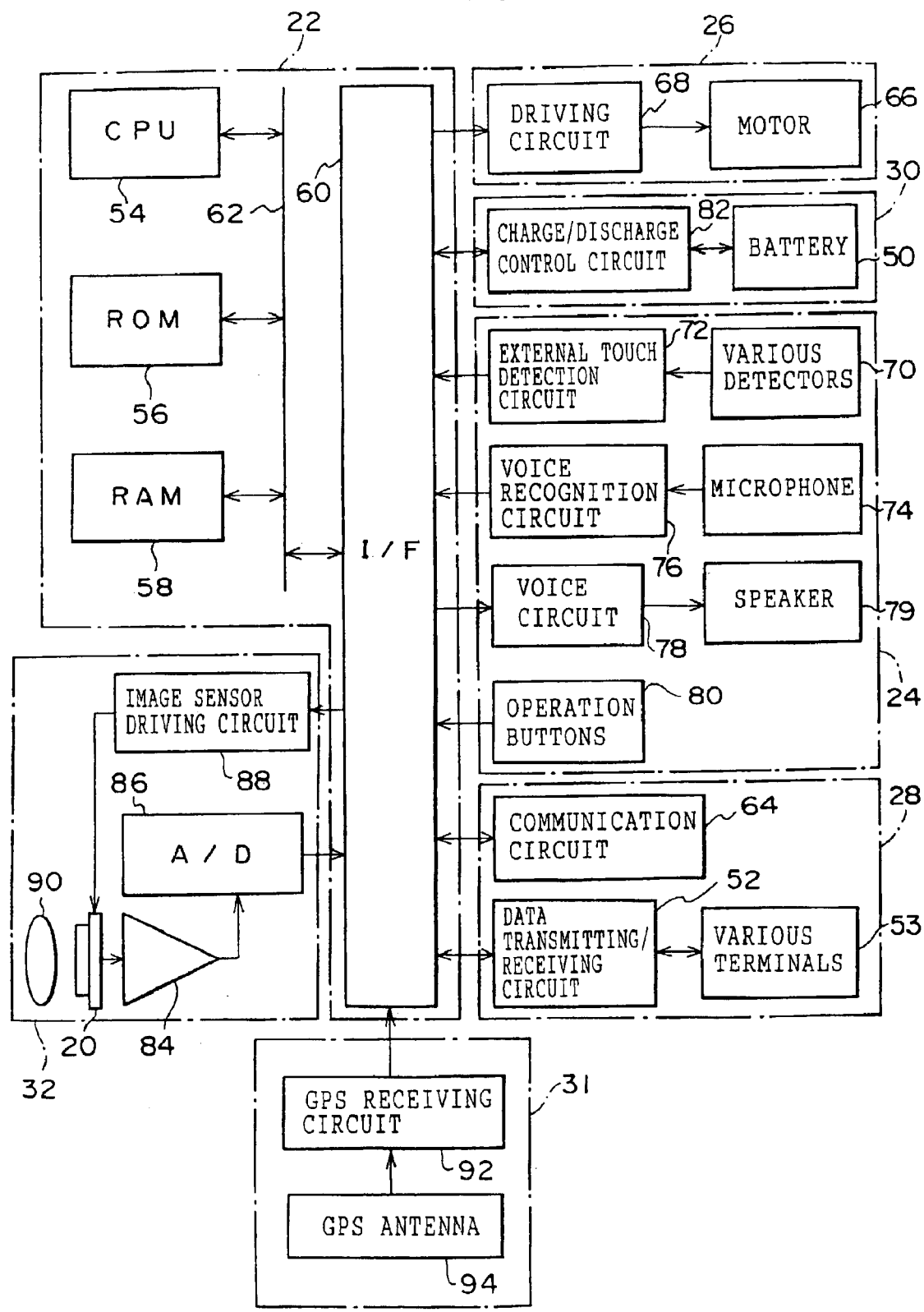
FIG. 9 is a block diagram showing the electrical configuration of the pet robot according to the second embodiment.

As shown in FIG. 9, the GPS 31 includes a GPS receiving circuit 92 and a GPS antenna 94. The GPS antenna 94 is connected to the I/F 60 through the GPS receiving circuit 92. The GPS antenna 94 is used to receive electric waves from the GPS satellites, and the GPS receiving circuit 92 is used to obtain the positional information of the pet robot 11 based on the signals received by the GPS antenna 94.

According to the embodiment, the RAM 58 stores information to specify the position of the output station 41 in addition to the image data (images) captured by the image sensor 20. Note that the information to specify the position of the output station 41 may be stored in another memory such as a non-volatile memory that is not shown. The information to specify the position of the output station 41 maybe obtained by a communication circuit 63, as is the case with the first embodiment. Alternatively, a recording medium such as a memory card recorded with the position specifying information may be mounted to the pet robot 11, and the information may be read from the recording medium.

According to the embodiment, with the operation buttons 80, the power supply of the pet robot 11 can be turned on/off, image-capturing may be instructed, and an image transfer instruction input to instruct image data stored in the pet robot 11 to be externally transferred may be carried out.

The functions of the embodiment will be described.

Figure 5:
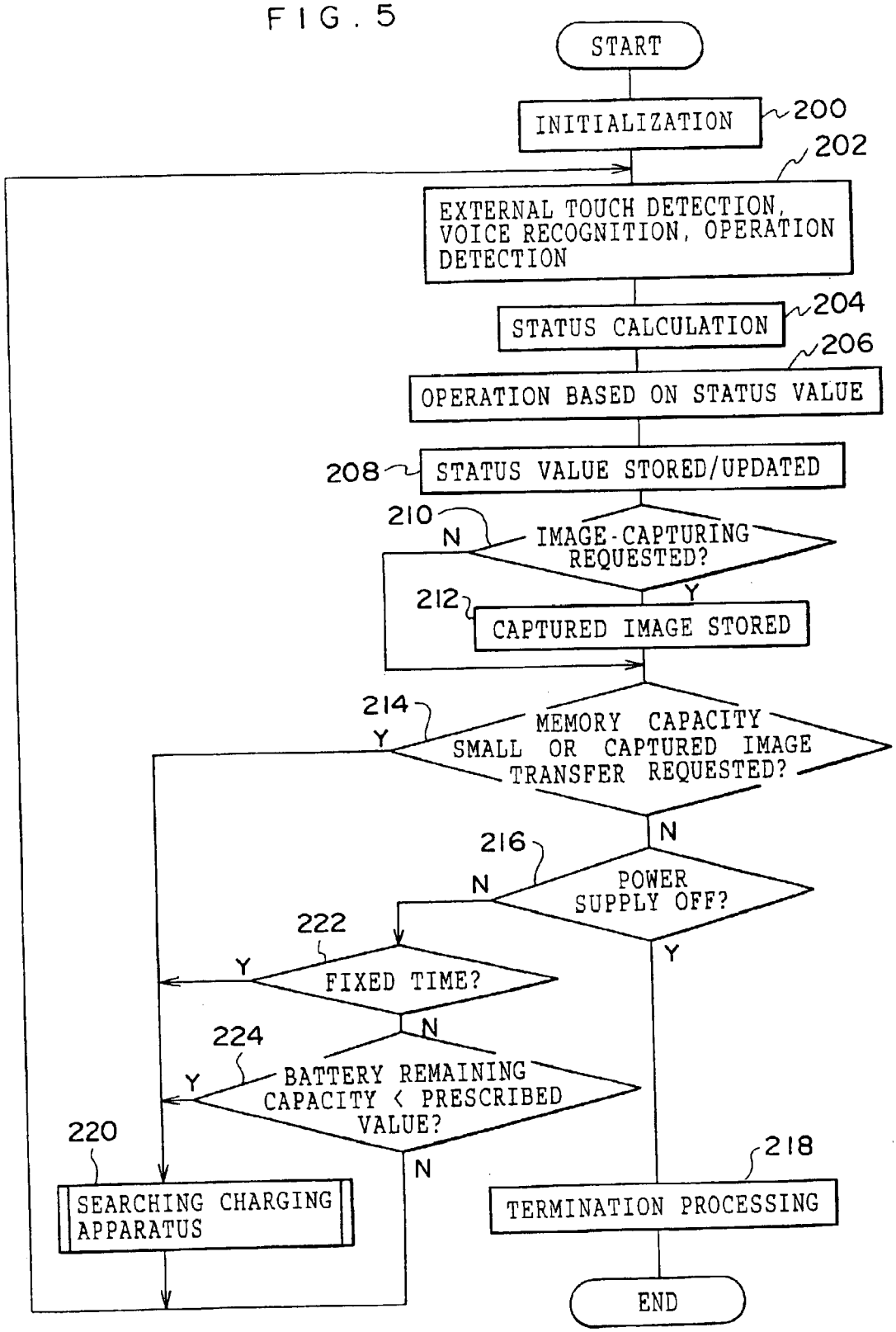
FIG. 5 is a flow chart for use in illustration of an example of the operation of the pet robot according to the first embodiment.

The pet robot 11 having the above-described structure operates substantially in the same manner as in the flowchart of FIG. 5. The main difference is that according to the first embodiment, the process of searching for the charging apparatus is replaced with the process of searching for the output station, that is, the process of searching for the charging apparatus is carried out in step 220, but according to the second embodiment, the process of searching for the output station is carried out instead of the process of searching for the charging apparatus. In the process of searching for the output station, the pet robot 11 seeks out the output station 41 (that will be described) in order to output image data to the output station 41.

According to the first embodiment, when it is determined in step 222 that the fixed amount of time has not yet passed, it is then determined in step 224 whether or not the remaining capacity of the battery is smaller than a predetermined volume. However, according to the second embodiment, the determination in step 224 is skipped, and when the result of the determination in 222 is negative, the process returns to 202 and the process at step 202 is repeated.

Figure 10:
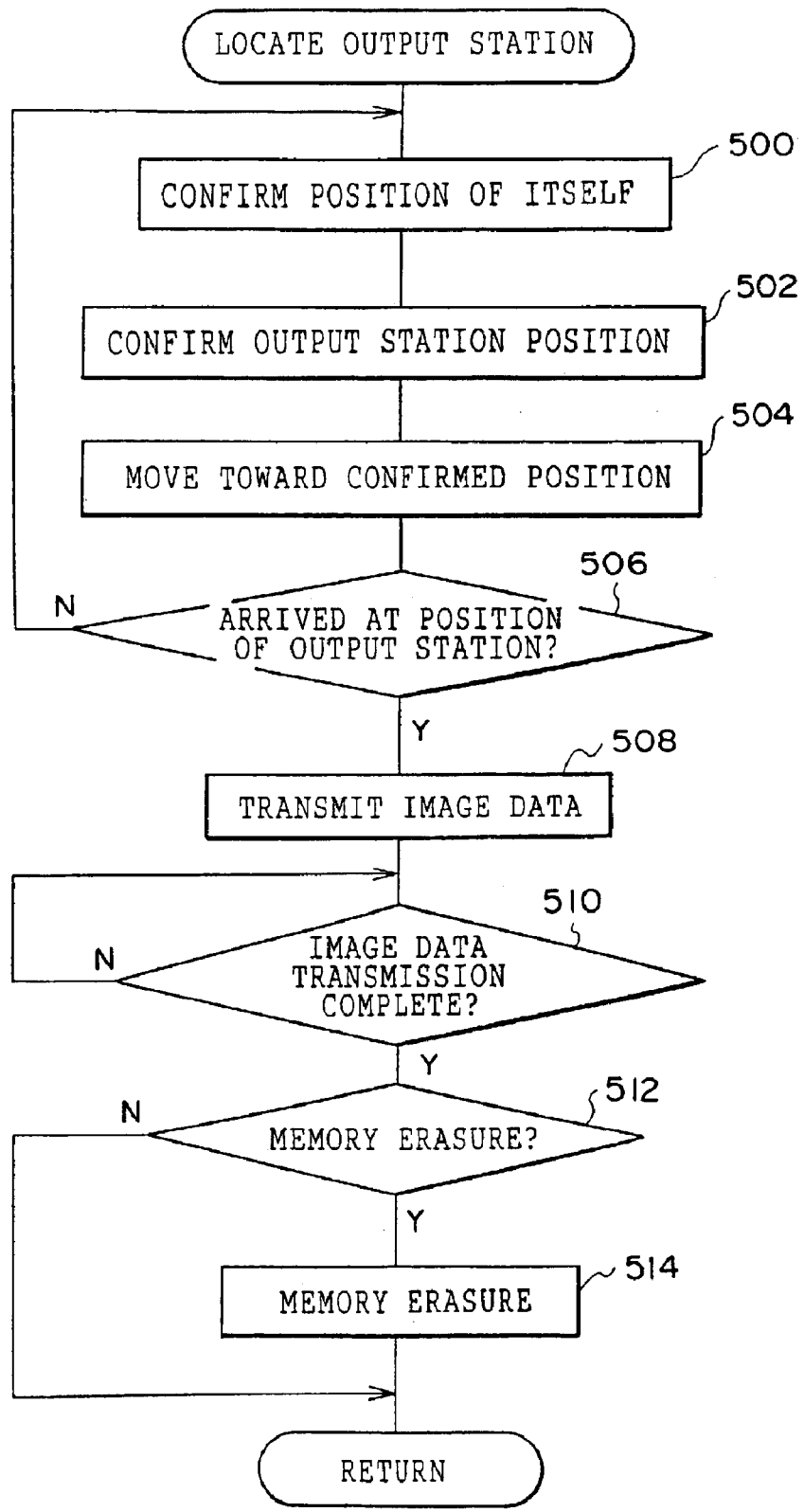
FIG. 10 is a flowchart for use in illustration of the output station processing.

Now, the process of searching for the output station in step 220 will be described in conjunction with the flowchart of FIG. 10.

In step 500, the position of the pet robot 11 is confirmed. More specifically, based on electric waves from a plurality of GPS satellites, its current positional information is calculated. The positional information is, for example, two-dimensional data such as latitude and longitude or three-dimensional data further including altitude. Note that the positional information may be obtained based on a signal received by an antenna instead of the GPS antenna 94 using electric waves from a base station whose position is known instead of the GPS 31.

In the next step 502, the position of the output station is confirmed. In the process of confirming the position of the output station, the distance, the direction, etc. to the output station from the pet robot 11 are confirmed. More specifically, the information to specify the position of the output station 41 that is pre-stored in the RAM 58, a separate memory such as a non-volatile memory or a storage medium, or received by the communication circuit 64 is read. Then, the read information to specify the position of the output station 41 and the positional information of itself obtained in step 500 are compared, and the distance and the direction to the output station 41 and the like from the pet robot 11 are confirmed.

In step 504, the pet robot 11 is driven by the driving section 26 to travel in the direction and for the distance obtained in step 502. In this way, the pet robot 11 is moved toward the confirmed position of the output station 41. In the next step 506, it is determined whether or not the pet robot 11 has reached the position of the output station 41. If the result of the determination in step 506 is negative, the process returns to step 500 and otherwise proceeds to step 508.

In step 508, image data stored in the pet robot 11 is transmitted to the output station 41. The result of the determination in the next step 510 continues to be negative until the transmission of the image data stored in the pet robot 11 is completed, and when the result is affirmative, the process proceeds to step 512.

In step 512, it is determined whether or not to erase the already transmitted image data stored in a memory such as the RAM 58. When the result of the determination is affirmative, the process proceeds to step 514, and the process of erasing is carried out to a memory such as the RAM 58 that stores the image data. When the result of the determination in step 512 is negative, the series of steps in the process of searching for the output station terminate.

Note that in the system including the pet robot 10 and the charging apparatus 40 according to the first embodiment, the above process of searching for the output station may readily be applied when the pet robot 10 is additionally provided with the GPS 31 and the process of confirming the self position in step 500 is carried out before step 300.

Now, an example of the process flow in the output station 41 will be described.

On the side of the output station 41, the process shown in FIG. 11 is carried out at predetermined time intervals, and the process proceeds to step 600.

In step 600, it is determined whether or not the pet robot 11 has reached the output station 41. When the result of the determination is negative, the process returns, and otherwise the process proceeds to step 602 and receives image data stored in the pet robot 11. The image data received in step 602 is stored in the image memory 45. The stored image data may be transmitted to another device by the communication section 42 or stored in a recording medium using the writing device 47.

In step 604, the result of the determination continues to be negative until the image data reception is completed. When the result becomes affirmative, the process proceeds to step 606, a completion notification indicating the completion of the reception of the image data is transmitted to the pet robot 11, and the routine returns.

In response to the notification, the output station 41 can carry out predetermined operation. In this way, the user can be aware of the operation state of the output station 41 and recognize the end of the data transfer.

The process which is similar to step 400 may be added before step 600, and the process of transmitting the positional information of the output station instead of the charging apparatus 40 may be carried out. Alternatively, a determination step which is similar to step 410 and a process which is similar to step 412 may be added after step 606, so that a print of a captured image may be produced in response to a printing instruction from the user.

As in the foregoing, the system including the pet robot 11 and the output station 41 according to the embodiment is provided with the GPS 31 to allow the pet robot 11 to autonomously travel. Therefore, the pet robot may autonomously travel to the output station 41 based on the remaining capacity of the memory or in response to the user's instruction to transfer image data.

Note that in the above embodiments, the battery 50 is used as the power supply section 30, but fuel cells that generate electrical energy by allowing hydrogen to react with oxygen in air may be used. In this case, the pet robot 11 may be provided with a fuel cell, hydrogen as a fuel for generation with the fuel cell or a source fuel for generating the hydrogen, and a hydrogen generator to generate a hydrogen-rich gas by modifying the source fuel with vapor. When the fuel must be supplemented, hydrocarbon like methanol or gasoline as a source fuel may be supplemented.

What is claimed is:

1. A pet robot charging system comprising a pet robot and a charging apparatus, said pet robot comprising:

an image-capturing section for capturing an image of an object;

an image-capturing control section for controlling image-capturing by said image-capturing section in response to a predetermined image-capturing instruction;

a storage section for storing image data obtained by image-capturing by said image-capturing section;

a moving portion for autonomously traveling in a work space, a battery as a power source;

a communication section for transmitting said image data, and for receiving charging position information representing a position to charge said battery, and a reception completion signal for transmission of said image data;

a setting section for setting an erasure confirmation state in order to input confirmation for erasure of the image data corresponding to the reception completion signal from the storage section, when said reception completion signal has been received; and a control section for controlling said communication section to transmit said image data after said moving portion is controlled based on said charging position information, and for controlling the erasure of said image data from said storage section based on said reception completion signal and the confirmation input by said setting section, when a predetermined condition is satisfied, and said charging apparatus comprising:

a transmitting/receiving section transmitting said charging position information, receiving said image data transmitted from said communication section, and transmitting said reception completion signal expressing the completion of reception of the image data;

a charging section for charging said battery; and a storage section for storing the image data received by said transmitting/receiving section.

2. The pet robot charging system according to claim 1, further comprising in said charging apparatus a recording section for recording an image on a recording material based on said image data.

3. The pet robot charging system according to claim 1, further comprising at the pet robot a detecting section for detecting a storage capacity of said storage section, said detecting section detecting, as said predetermined condition, whether or not said storage capacity is smaller than a predetermined amount.

4. The pet robot charging system according to claim 1, further comprising at the pet robot a detecting section for detecting a storage capacity of said storage section, wherein said control section controls said moving portion based on said charging position information when said detecting section detects that said storage capacity is smaller than a predetermined amount and then controls said communication section to transmit said image data, so that said image data corresponding to said reception completion signal is erased from said storage section based on said transmission completion signal.

5. The pet robot charging system according to claim 1, further comprising a remaining capacity detecting section for detecting a remaining capacity of said battery in the pet robot, wherein said remaining capacity detecting section detects, as said predetermined condition, whether or not said battery remaining capacity is smaller than a predetermined amount.

6. The pet robot charging system according to claim 1, further comprising at said charging apparatus for displaying a display section a captured image based on said image data received by said transmitting/receiving section.

7. The pet robot charging system according to claim 2, further comprising at said charging apparatus an image selection section for selecting said image data on which the image to be recorded by said recording section is based.

8. A robot comprising:

an image-capturing section for capturing an image of an object;

an image-capturing control section for controlling image-capturing by said image-capturing section in response to a predetermined image-capturing instruction;

a storage section for storing image data obtained by image-capturing by said image-capturing section;

a moving portion for autonomously moving;

a communication section for transmitting said image data;

a control section for controlling said moving portion to move to a predetermined output position to output said image data when a predetermined condition is satisfied, and then controlling said communication section to transmit said image data; and a detecting section for detecting a storage capacity of said storage section, wherein said control section determines that said predetermined condition has been satisfied when said storage capacity is smaller than a predetermined amount as the result of detection by said detecting section.

9. A robot comprising:

an image-capturing section for capturing an image of an object;

an image-capturing control section for controlling image-capturing by said image-capturing section in response to a predetermined image-capturing instruction;

a storage section for storing image data obtained by image-capturing by said image-capturing section;

a moving portion for autonomously moving;

a communication section for transmitting said image data;

a control section for controlling said moving portion to move to a predetermined output position to output said image data when a predetermined condition is satisfied, and then controlling said communication section to transmit said image data; and a transmission instruction section for instructing said communication section to transmit said image data, wherein said control section determines that said predetermined condition is satisfied when a transmission instruction is made by said transmission instruction section.

10. The robot according to claim 8, wherein:

said communication section receives positional information representing said output position; and said control section controls said moving portion to move to the output position based on the received positional information.

11. A robot comprising:

an image-capturing section for capturing an image of an object;

an image-capturing control section for controlling image-capturing by said image-capturing section in response to a predetermined image-capturing instruction;

a storage section for storing image data obtained by image-capturing by said image-capturing section;

a moving portion for autonomously moving;

a communication section for transmitting said image data; and a control section for controlling said moving portion to move to a predetermined output position to output said image data when a predetermined condition is satisfied, and then controlling said communication section to transmit said image data; and a self position detecting section for detecting the position of itself, wherein said control section controls said moving portion based on the position of itself and said output position.

12. A robot comprising:

an image-capturing section for capturing an image of an object;

an image-capturing control section for controlling image-capturing by said image-capturing section in response to a predetermined image-capturing instruction;

a storage section for storing image data obtained by image-capturing by said image-capturing section;

a moving portion for autonomously moving;

a communication section for transmitting said image data; and a control section for controlling said moving portion to move to a predetermined output position to output said image data when a predetermined condition is satisfied, and then controlling said communication section to transmit said image data; and a remaining capacity detecting section for detecting a remaining capacity of a battery provided as a power source, wherein said control section determines that said predetermined condition is satisfied when the remaining capacity of said battery is smaller than a predetermined amount as the detection result of said remaining capacity detecting section.

13. The robot according to claim 12, wherein said output position is at a charging position for charging said battery.

14. The robot according to claim 12, wherein said communication section receives charging position information representing said charging position.

15. A robot comprising:

an image-capturing section for capturing an image of an object;

an image-capturing control section for controlling image-capturing by said image-capturing section in response to a predetermined image-capturing instruction;

a storage section for storing image data obtained by image-capturing by said image-capturing section;

a moving portion for autonomously moving;

a communication section for transmitting said image data; and a control section for controlling said moving portion to move to a predetermined output position to output said image data when a predetermined condition is satisfied, and then controlling said communication section to transmit said image data;

wherein said communication section receives a reception completion signal for transmission of said image data; and said control section erases said image data corresponding to said reception completion signal from said storage section.

* * * * *